United States Patent
Kashi

(10) Patent No.: US 8,707,186 B2
(45) Date of Patent: Apr. 22, 2014

(54) CONFERENCE RECAP AND RECORDING

(75) Inventor: Ramanujan Kashi, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 210 days.

(21) Appl. No.: 12/823,710

(22) Filed: Jun. 25, 2010

(65) Prior Publication Data

US 2011/0320958 A1 Dec. 29, 2011

(51) Int. Cl.
*G06F 3/048* (2013.01)
*G06F 3/01* (2006.01)

(52) U.S. Cl.
USPC ........... 715/751; 715/752; 715/753; 715/758; 715/963; 709/204; 709/205

(58) Field of Classification Search
USPC .................. 715/751, 963, 753, 758
See application file for complete search history.

(56) References Cited

U.S. PATENT DOCUMENTS

| | | | | |
|---|---|---|---|---|
| 5,323,314 | A * | 6/1994 | Baber et al. .................. | 705/7.19 |
| 5,963,913 | A * | 10/1999 | Henneuse et al. ........... | 705/7.13 |
| 6,938,069 | B1 * | 8/2005 | Narayanaswamy .......... | 709/204 |
| 7,679,518 | B1 * | 3/2010 | Pabla et al. ................ | 340/573.1 |
| 2003/0046304 | A1 * | 3/2003 | Peskin et al. ............... | 707/104.1 |
| 2003/0220973 | A1 * | 11/2003 | Zhu et al. ...................... | 709/205 |
| 2005/0101335 | A1 * | 5/2005 | Kelly et al. ................. | 455/456.3 |
| 2009/0181659 | A1 * | 7/2009 | Stalnacke et al. ............ | 455/416 |
| 2010/0037151 | A1 * | 2/2010 | Ackerman et al. ........... | 715/753 |
| 2011/0040834 | A1 * | 2/2011 | Schaefer et al. ............. | 709/204 |
| 2011/0054976 | A1 * | 3/2011 | Adler et al. ....................... | 705/9 |
| 2011/0320958 | A1 * | 12/2011 | Kashi ............................ | 715/751 |
| 2012/0209663 | A1 * | 8/2012 | Gaskins et al. ............. | 705/7.36 |

OTHER PUBLICATIONS

Felitec Inc, Mindful, Jun. 3, 2009, pp. 1-12 http://web.archive.org/web/20090603083504/http://www.felitec.com/mindful.html.*
Felitec Inc, Mindful, Jun 3, 2009, pp. 1-12 http://web.archive.org/web/20090603083504/http://www.felitec.com/mindful.html.*
Microsoft Outlook 2007 with Service Pack 2, Apr. 2009, pp. 1-5.*

* cited by examiner

*Primary Examiner* — Stephen Hong
*Assistant Examiner* — Mario M Velez-Lopez
(74) *Attorney, Agent, or Firm* — Sheridan Ross P.C.

(57) ABSTRACT

A method, system, and device are provided for presenting event views via a calendaring application or the like. In particular, the event view is alterable depending upon whether or not the event currently being viewed is a past event or not. Past events may posses additional attributes not possessed by other events and, therefore, the presentation of a past event and the information related thereto may differ from the presentation of other events.

17 Claims, 6 Drawing Sheets

CONFERENCE RECAP AND RECORDING

FIELD

The disclosure relates generally to organizing multimedia information and particularly to presenting information about meetings which have occurred in the past.

BACKGROUND

Communications today provide a myriad of temporally dependent, recorded multimedia information. For example, multimedia conference sessions can include video information, such as participant video images and/or power point presentations, and audio information, such as each participant's oral comments. The various participants can exchange, during and as part of the multimedia conference session, emails and instant messages and can use different communication options to communicate selectively and privately with a subset of participants. A participant can take notes during the conference session or otherwise mark points during the session for later reference.

Current conference session applications record some of this information in a linked manner but are unable to link seemingly independent communication threads or channels between a subset of participants and other information, such as participant notes. Even the information that is linked is often not presented historically to a participant in a comprehensible, entertaining, or otherwise user friendly manner.

Moreover, current calendaring applications, such as those provided with Microsoft Outlook and Lotus Notes, only provide generic information for calendar events. More specifically, the type of information currently displayed in connection with calendar events are generic regardless of whether or not the event has already occurred.

SUMMARY

These and other needs are addressed by the various embodiments and configurations of the present disclosure.

In particular, it is one aspect of the present disclosure to provide a calendaring application which allows users to view both events that will happen in the future and events that have happened in the past. For events that will happen in the future, the details of the invited participant list, conference room (or similar required resources), reminder information, recurrence information, etc. are displayed. For meetings that have been conducted (i.e., past events), there are extra tabs or data fields which provide additional and useful information about the already occurred event. As one example, a tab can be provided which shows the action items that were created during the past event, who is responsible for such action items, and who is to be the recipients of such action items. Another exemplary tab may provide links to the slides and other material used in the meeting. This linking may be accomplished by utilizing a web-conferencing tool or the like. Yet another exemplary tab may include a pointer or link to the audio and/or video recording of the already occurred event. This linking may be realized by integrating the calendaring application with a meeting exchange solution or similar audio bridges.

It is one aspect of the present disclosure to capture the details and exchanges of the already occurred event or portion of an event, retrieve relevant contextual information, determine whether the past event is a part of a recurring event or whether a follow-up event was scheduled during the past event to address action items generated during the past event, etc. This captured information may be formatted in accordance with requirements of the calendar application and be displayed or made available via the conferencing application.

In some embodiments, recurring meetings are given special treatment. For instance, a recurring meeting may be considered a past event and/or a future event. Moreover, the type of information displayed in a future meeting can be considerably enhanced where that future meeting (e.g., a meeting which is to occur next week) is a part of a recurring meeting and is related to a past meeting (e.g., a meeting which occurred last week) that was also a part of the same recurring meeting. In this scenario, relevant information from the past meeting can be displayed not only in connection with historical view of the past meeting but also in a view of the future meeting. As an example, if action items were generated during the past meeting, those action items may be displayed in connection with the future meeting by virtue of the fact that both the past and future meeting belong to the same recurring meeting. Other information relevant to the past and future meeting, such as context information determined from the past meeting, can also be displayed in a view of the future meeting. Likewise, information regarding the future meeting can be displayed in the view of the past meeting and if multiple past meetings all belonging to the same recurring meeting exist, then the views for each of those past meetings can be updated as a new meeting occurs which is also a part of the same recurring meeting. In particular, open action items can be closed as they are completed, recordings of past meetings can be linked to recordings of other past meetings, etc.

In some embodiments, a module operating in conjunction with a conference server may automatically capture the actual participant list, have links to the audio/video/presentation, prepare recordings or transcriptions of the already occurred event, and the like. Participants to the event can annotate and capture minutes of meeting, action items, etc. with the proposed module. All, or a subset, of the participants will then be associated with the conference reference that is stored in the calendaring application and may be able to view information maintained in connection with the past occurred event. In some embodiments, participants are allowed to add any comments after they have attended the event so that this becomes available for the participant list to view. Notes may be annotated to reflect whether or not they were made during the event or after the event.

In some embodiments, the module facilitating the unique representation of past occurred events can be either a standalone solution or a plugin to existing calendaring solutions (e.g., Microsoft Outlook, Lotus Notes, etc.).

In accordance with at least some embodiments of the present invention a method is provided that generally comprises:

determining that a user desires to view a calendar event with a user interface of a communication device, wherein a display of the calendar event is generated in connection with a calendar application;

determining, by a calendar application, whether the event corresponds to (i) a past event; (ii) a current event; or (iii) a future event; and configuring a display of the event on the user interface in accordance with the determination of whether the event corresponds to (i) a past event; (ii) a current event; or (iii) a future event.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "conference" or "conference session" refers to a single- or multimedia voice call or other type of session among three or more parties.

The terms "desktop sharing" or "application sharing" or "remote desktop sharing" refer a user controlling, by remote control software, a local computer from a remote location via a network connection. The remote control software is installed at both ends and typically both local and remote users can control the machine. Each user sees the same screen display as if they were both looking at the same machine.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The term "presence information" refers to any information associated with a network node and/or endpoint device, such as a communication device, that is in turn associated with a person or identity. Presence information can indicate user status (e.g., online or offline), user availability (e.g., available, busy, on the phone, or out to lunch), user's desired contact means (e.g., instant messaging, circuit-switched telephone, packet-switched telephone, cell phone, pager, etc.) that may vary by contactor identity and/or contact time, and at what endpoint a contactor is most likely to reach successfully the presence service subscriber. Presence information can span a number of different communication channels. The aggregated view of a user's presence (that is, the availability across all of an individual's SIP-enabled devices) is called Multiple Points of Presence or MPOP. Examples of information useful in determining a user's presence and availability include information regarding the accessibility of the endpoint device, the recency of use of the endpoint device by the person, recency of authentication by the person to a network component, recency of registration of an endpoint device, an endpoint publishing presence information, SUBSCRIPTION requests generated by a user agent in the user's endpoint device, geographical location of the user using mobile device location information, scheduled activities on the user's calendar, indications whether or not a user has been reading or sending email, and an indication whether the user's email application has an out of office setting. Present information can be, for example, the electronic address of a device at which the service subscriber is currently deemed to be present and/or available.

The term "whisper page" is a form of enhanced intrusion. The capability enables selected parties to intrude on calls that are already in progress. The intruding party intrudes on the existing call and all parties hear a tone. The speech path is enabled between the intruding party and the called extension, the other party is forced onto hold and will not hear the conversation. On completion of the intrusion, the called party speech path is reconnected to the original connected party.

The term "whiteboard" or "electronic blackboard" refers to a common area between applications and users in which mutually information is stored in a standard form that all conference session participants can access.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

DETAILED DESCRIPTION

The disclosure, in one embodiment, provides a system and method to facilitate user interaction with a calendar application. For example, a conference system using the concepts of this disclosure can record the multimedia streams exchanged by the various participant nodes to a conference session, identify and record distinct communication threads or channels involving one or more conference participants that are related to the session, and associate, or link, the various forms of recorded information together in a form that is viewable and manipulable by a user. A calendar application is then provided which allows a user to view and manipulate such information based on the fact that the event already occurred.

The various embodiments and configurations in this disclosure will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any application in which it is desirable to collect and associate related and temporally changing multimedia information for presentation to a user.

Figure 1:
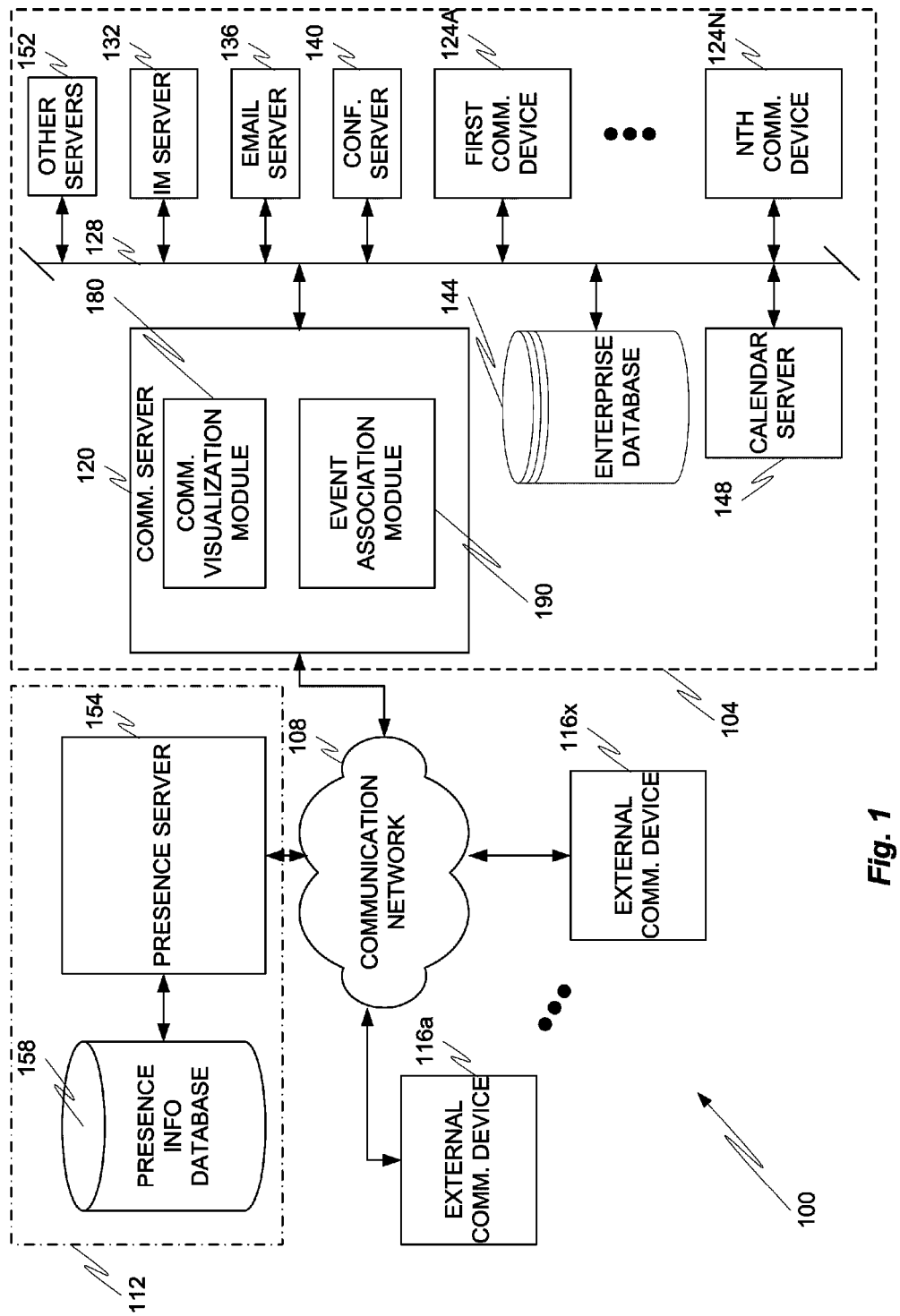
FIG. 1 is a block diagram of a communication system according to an embodiment of the present disclosure.

FIG. 1 depicts a communication system 100 according to an embodiment. The communication system 100 may include an enterprise network 104 that is in communication, via a (typically untrusted or unsecure or public) communication network 108, with a presence service 112, and a plurality of external communication devices 116a-x.

The communication network 108 may be packet-switched and/or circuit-switched. An exemplary communication network 108 includes, without limitation, a Wide Area Network (WAN) such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a communications server 120, an instant message server 132, an email server 136, a (web) conference server 140, other servers 152, an enterprise database 144, an electronic calendar server 148, and a plurality of internal first, second, . . . nth communications devices 124a-n, interconnected by a (trusted or secure or private) Local Area Network (LAN) 128. The LAN 128 can be secured from intrusion by untrusted parties by a gateway (not shown) and/or firewall (not shown) located between the LAN 128 and communication network 108.

As will be appreciated, extensions of internal communication devices are extensions within the enterprise network 104 that are directly serviced and controlled by the communication server 120. More particularly, these extensions correspond to endpoints serviced by the communication server 120, and the communication server 120 can direct incoming contacts to and receive outgoing contacts from these extensions in a conventional manner. External terminals are not directly supported as endpoints by the communication server 120.

The communications server 120 can include a PBX, an enterprise switch, an enterprise server, or other type of telecommunications system switch or server. The communication server 120 is preferably configured to execute telecommunication applications such as the suite of MultiVantage™ or Aura™ applications of Avaya, Inc., including Communication Manager™, Aura Communication Manager™, Avaya IP Office™, and MultiVantage Express™.

The communication server 120 preferably includes one or more conferencing applications and associated hardware, such as MultiPoint Conferencing Units™ (MCU), Unified Conferencing™, Web Conferencing™, IP Office Conferencing™, and/or Meeting Exchange™ of Avaya, Inc. These products typically require the participants to dial into a conference bridge using a predetermined dial-in number and access code to initiate conference sessions, without an operator or advanced reservations. As will be appreciated, these products further provide integrated features such as audio and web conference session management, power point push, document annotation and other annotation tools, text chat, desktop and application sharing, polling with instant tabulation, interactive whiteboard session, and conference session recording and playback of audio and web portions of the conference session. The products can enable streamed video from presenters, such as using a webcam, and provide a roster display of participants, a discussion window that provides keyboard chatting that can be private between participants or broadcast and visible to all participants, a capability that enables a host to promote a participant to host status so the participant can control the conference session, recording and playback of audio and web portions of the conference session, and LDAP integration of corporate directories and databases. The host can identify speakers, mute selected or all participants, (forcefully) disconnect selected participants, start and stop synchronized recording of the conference session, and synchronize recording of combined web and audio streams.

The instant messaging server 132 can support any suitable instant messaging application, such as AOL™, MSN Messenger™, Yahoo! Messenger™, Live Messenger™, and Apple's iChat™.

The email server 136 can support any suitable email application, such as Microsoft Outlook™ or Lotus Notes™. In some embodiments, the email server 136 provides email functionality as well as calendar applications and related functionality.

The conferencing server 140 can be any suitable conferencing server, such as a 1056-port CS700 and CS780 Conferencing Server™ of Avaya, Inc. The conferencing server 140 typically includes conferencing bridge functionality.

The calendar server 148 contains subscriber electronic calendars, such as Outlook™ by Microsoft, Inc. The electronic calendar, as will be appreciated, includes scheduled events indexed by date and time. In some embodiments, the calendar server 148 may be provided and operate in conjunction with the email server 136. In some embodiments, the calendar server 148 and email server 136 are separate servers.

The other servers 152 include a variety of servers, including facsimile servers and messaging servers (such as Avaya Inc.'s Unified Messaging™ server).

The first, second, . . . nth communication devices 124a-n can be any IP-capable hard- or softphone and/or digital telephone modified to perform the operations of the present invention. Examples of suitable modified IP telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™), and softphones of Avaya, Inc.

The enterprise database 144 includes enterprise subscriber information, such as name, job title, electronic address information (e.g., telephone number, email address, instant messaging handle, direct dial extension, and the like), subscriber contact lists (e.g., contact name and electronic address information), other employee records, and the like.

The presence service 112 includes a presence server 154 and an associated presence information database 158 that may or may not be operated by (or be external to) the enterprise network. The presence server 154 and presence information database 158 collectively track the presence and/or availability of presence service subscribers and/or their communication devices and provide, to requesting entities, current presence information respecting selected presence service subscribers. As will be appreciated, when the presence service 112 is external to the enterprise the presence service subscribers are different from the enterprise subscribers. In some embodiments, however, the presence service 112 is internal to the enterprise network 104 and the presence server 154 is connected to the LAN 128.

The external communication devices 116a-x can be any suitable circuit- or packet-switched or digital (e.g., TDM-enabled) communication device. Examples include wired and wireless telephones, Personal Digital Assistants or PDAs, Personal Computers or PCs, laptops, packet-based H.320 video phones and conferencing units, packet-based voice messaging and response units, peer-to-peer based communication devices, and packet-based traditional computer telephony adjuncts.

While the communication system 100 depicts the various servers 132, 136, 140, 148, and 152 as being separate from the communication server 120 and being internal to the enterprise network 104, it is to be understood that the servers may be hosted by the communication server 120 or be located on the communication network 108. For example, the conferencing application can be on the WAN-side of the firewall (not shown) and provide conference session security by means of a conference session URL and security code. In some embodiments, the communication server 120 may be provided in the form of Software as a Service (SaaS) that is accessible via a web interface.

Included in the memory of the communication server 120 are a processor and instructions to be executed by the processor. In some embodiments, the instructions include instructions for executing a communication visualization module 180 and event association module 190. The communication visualization module 180 allows the communication server 120 to receive multimedia information from the event association module 190 and create a visualization container for the information. The visualization container includes not only the information but also control settings, such as the scanning system (e.g., progressive or interlaced scanning, the number of frames or fields per second, the resolution, the encoding algorithm, if any, and the like) and formatting commands (which specify not only the formatting of various display segments but also the presentation of the information to the user). The event association module 190 identifies relationships between otherwise discrete or unrelated sets of information, such as communication threads or channels, created documents, conference session audio and/or video streams, and the like.

The modules 180, 190 of the communication server 120 may be leveraged by the calendar server 148 to prepare a presentation of information related to past events. In some embodiments, the data that is displayed for a past event (or possibly a past portion of a current event) is obtained directly from the communication server 120. In some embodiments, the data that is displayed for a past event is obtained from the communication server 120 and altered according to whether or not a view of the past event attended the past event. In some embodiments, the data that is displayed for a past event is obtained from a number of different sources of information (e.g., call logs, internal document storage servers, email servers conference recording devices, etc.), which is usually the case in the presentation of contextual information for a past event.

Figure 2:
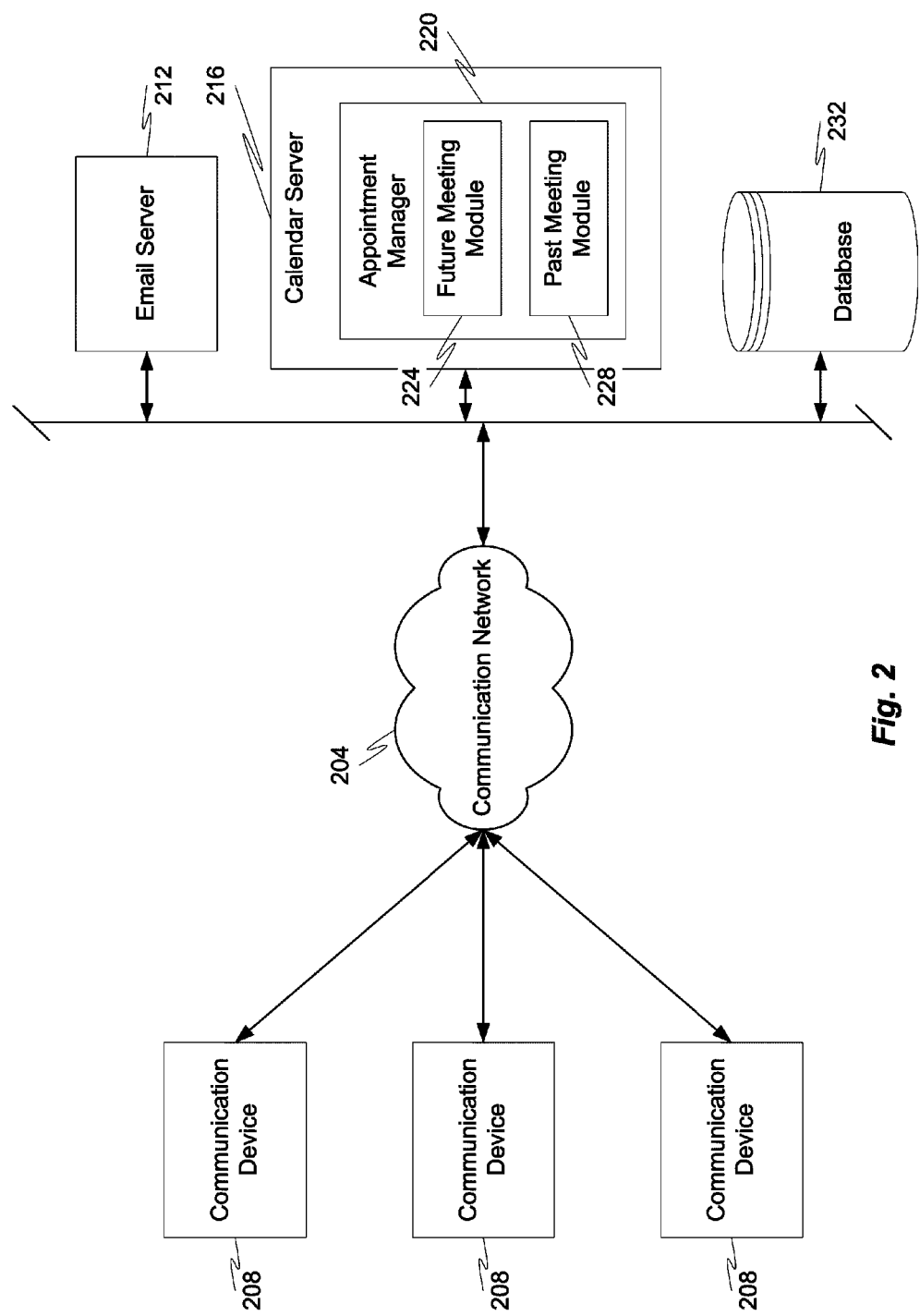
FIG. 2 is a block diagram of an email and calendaring system according to an embodiment of the present disclosure.

With reference now to FIG. 2, additional details of an email and calendaring system 200 will be described in accordance with at least some embodiments of the present invention. The email and calendaring system 200 may be a subset of the enterprise network 104. In some embodiments, the email and calendaring system 200 includes a communication network 204 interconnecting a plurality of communication devices 208 to an email server 212, a calendar server 216, and a database 232.

The communication network 204 may be the LAN 128, the communication network 108, or a combination thereof. In particular, the communication network 204 generally comprises any type of functionality for routing communications between communication devices or between a communication devices and one or more servers.

The communication devices 208 may be similar to the internal communication devices 123A-N or the external communication devices 116a-x. In some embodiments, some of the communication devices 208 are internal communication devices and others are external communication devices.

The email server 212 provides email capabilities to users of the communication devices 208. In some embodiments, the email server 212 is similar or identical to the email server 136. In some embodiments, the email server 212 is a web-server which provides email functionality to a communication device 208 via a browser application. By accessing the email server 212, the communication device 208 can be used to compose emails for transmission to other communication devices 208, view emails that have been sent to a particular user associated with the communication 208, and so on.

The calendar server 216 may work in conjunction with the email server 216 to provide scheduling and resource management capabilities to the communication devices 216. The email server 212 may access applications on the calendar server 216, like an appointment manager 220, to perform scheduling functions via email. For example, a calendar service may be provided via an email application stored on the email server 212. Information related to the calendar service may be retrieved from the calendar server 216 and presented to the user through an email application. In one embodiment, calendar events may be generated and transmitted to various users of the communication devices 208 via email, where a calendar event may relate to a task, meeting, and/or request for a shared resource. Moreover, details related to calendar events may be displayed for users via their communication devices 208.

In some embodiments, the appointment manager 220 includes a future meeting module 224 and a past meeting module 228. The appointment manager 220 may be capable of delegating event processing tasks between the future meeting module 224 and the past meeting module 228. For example, if a request is received to display an event and details thereof, the appointment manager 220 may determine whether the requested event corresponds to a past event or a future event. If the event is determined to be a past event (i.e., an event which has already occurred), then the appointment manager 220 may invoke the past meeting module 228 to process the request. If the event is determined to be a future event (i.e., an event which has not yet occurred), then the appointment manager 220 may invoke the future meeting module 228 to process the request. If the event is determined to be a current event (i.e., an event which is currently being conducted), then the appointment manager 220 may invoke the future meeting module 224 and/or the past meeting module 228. In particular, the past meeting module 228 may be invoked to process the entire request in some embodiments. In other embodiments, the future meeting module 224 may be invoked to process the entire request. In still other embodiments, the future meeting module 224 and past meeting module 228 may both be invoked to process the request. In this situation, the past meeting module 228 may process the already occurred portion of the event and the future meeting module 224 may process any remaining portion of the event.

The database 232 may include any data storage medium capable of maintaining data related to users of the communication devices 208, the communication devices 208, calendar events, or other important information. As an example, the database 232 may include data related to a user preferences for having events displayed. Accordingly, the user preferences can be retrieved by one or more modules of the appointment manager 220 when preparing an event view for a user. The database 232 may include one or more magnetic storage devices, optical storage devices, solid state storage devices, or the like.

In some embodiments, the appointment manager 220 and the modules thereof may be a native application of the calendar server 216 and may be included as a part of the higher-level calendar application. In some embodiments, the appointment manager 220 or a module thereof may be provided as a plugin to the calendar server 216 or the applications residing thereon.

In some embodiments, the functionality of the email server 212 and calendar server 216 may be combined into a single server or processor capable of providing email and scheduling services to the communication endpoints 208. While it may be preferable to provide the high-level calendaring application, the appointment manager 220, and its modules on a calendar server 216 as a shared resource for multiple communication devices 208, it may also be possibly to provide calendaring and/or email functionality in a client-based format.

Figure 3:
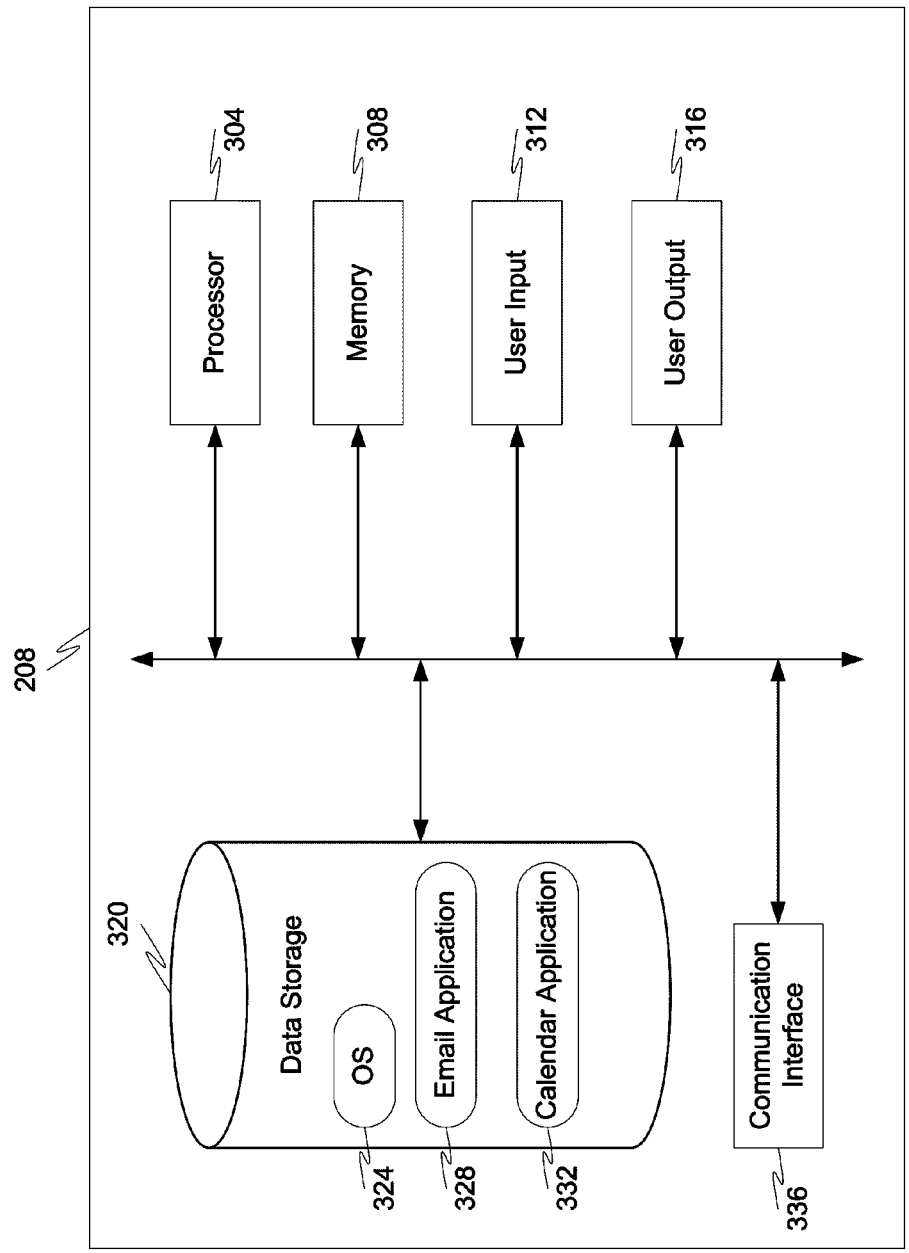
FIG. 3 is a block diagram of a communication device according to an embodiment of the present disclosure.

With reference now to FIG. 3, components of a communication device 208, like a communications or computing device, are depicted in block diagram form in accordance with embodiments of the present invention. The components may include a processor 304 capable of executing program instructions. Accordingly, the processor 304 may include any general purpose programmable processor, digital signal processor (DSP) or controller for executing application programming. Alternatively, the processor 304 may comprise a specially configured application specific integrated circuit (ASIC). The processor 304 generally functions to run programming code implementing various functions performed by the communication device 208 or servers.

A communication device 208 may additionally include memory 308 for use in connection with the execution of programming by the processor 304 and for the temporary or long term storage of data or program instructions. The memory 308 may comprise solid state memory resident, removable or remote in nature, such as DRAM and SDRAM. Where the processor 304 comprises a controller, the memory 308 may be integral to the processor 304.

In addition, the communication device 208 may include one or more user inputs or means for receiving user input 312 and one or more user outputs or means for outputting 316. Examples of user inputs 312 include keyboards, keypads, touch screens, touch pads and microphones. Examples of user outputs 316 include speakers, display screens (including touch screen displays) and indicator lights. Furthermore, the user input 312 may be combined or operated in conjunction with a user output 312. An example of such an integrated user input 312 and user output 316 is a touch screen display that can both present visual information to a user and receive input selections from a user.

A communication device 208 may also include data storage 320 for the storage of application programming and/or data. In addition, operating system software 324 may be stored in the data storage 320. The data storage 320 may comprise, for example, a magnetic storage device, a solid state storage device, an optical storage device, a logic circuit, or any combination of such devices. It should further be appreciated that the programs and data that may be maintained in the data storage 320 can comprise software, firmware or hardware logic, depending on the particular implementation of the data storage 320.

Examples of other applications that may be stored in the data storage 320 include, without limitation, an email application 328 that allows the user of the device 208 to view, access, and manipulate locally maintained email data or email data on the email server 212. For example, the email application 328 may provide a user friendly interface that presents data from the email server 212 and/or calendar server 216 to the user in a logical fashion, allows the user to create emails for transmission to other users, and further respond to and/or forward emails received from other users.

Another application that may reside in data storage 320 is a calendar application 332. The calendar application 332 may maintain a personal event calendar and resource availability chart for a user associated with the device 208. The calendar application 332 may be used to view upcoming events or tasks for a particular person or group of people. The email application 328 and calendar application 332 may be similar to the applications provided by the email server 212 and calendar server 216, respectively, and may work cooperatively to schedule calendar items via email with other users. The data storage 320 may also contain application programming and data used in connection with the performance of other functions of the communication device 208 or server 212, 216. For example, in connection with a communication device 208 such as a telephone or IP telephone, the data storage 320 may include communication application software. As another example, a communication device 208 such as a Personal Digital Assistant (PDA) or a general purpose computer may include a word processing application in the data storage 320.

A communication device 208 or servers 212, 216 may also include one or more communication network interfaces 336. Examples of communication network interfaces 336 include a network interface card, a modem, a wired telephony port, a serial or parallel data port, radio frequency broadcast receiver or other wired or wireless communication network interfaces.

Figure 4:
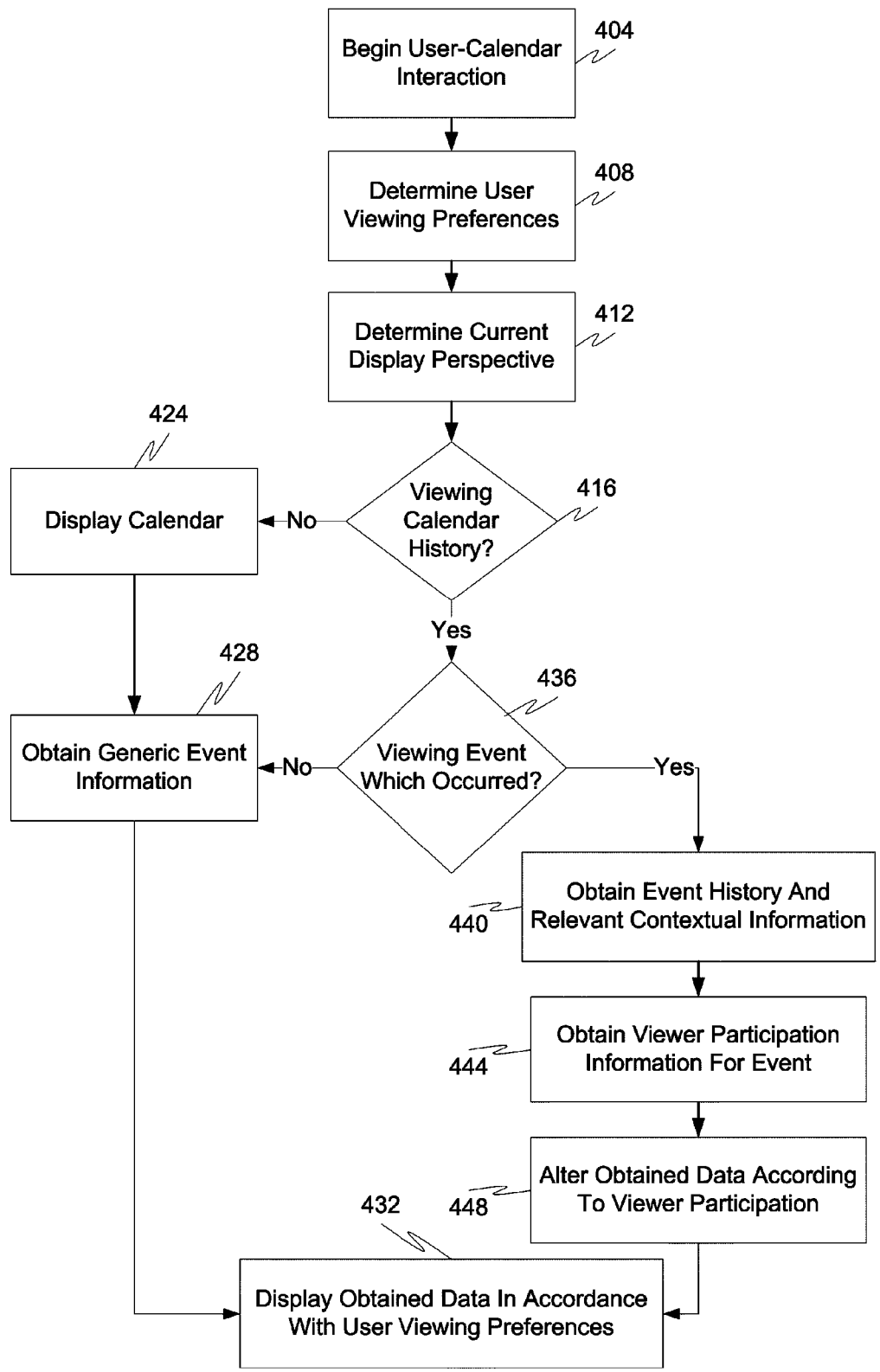
FIG. 4 is a flow diagram depicting an exemplary method of executing a calendar application according to an embodiment of the present disclosure.

With reference now to FIG. 4, an exemplary method of executing a calendar application will be described in accordance with at least some embodiments of the present disclosure. The method begins when a user opens a calendar application and a user-calendar interaction is initiated (step 404). As noted above, the calendar application, which contains the appointment manager 220, may be executed by the user's communication device or by one or more servers which are in communication with the user's communication device.

Thereafter, the appointment manager 220 (and possibly an email application operating in cooperation with the appointment manager 220) determines the user's viewing preferences for various calendar views which may be presented to the user (step 408). Based on these viewing preferences, which may correspond to default viewing preferences, the appointment manager 220 renders a current display perspective (step 412). The current display perspective may generally include a month-wide, week-wide, and/or day view that summarizes the user's events in the appropriate fashion.

As the higher-level calendar is displayed to the user, the appointment manager 220 determines whether the user desires to view a particular event which is either (i) already occurred, (ii) currently occurring, or (iii) yet to occur. This determination may be made by detecting that a user has selected a particular event for viewing, has scrolled their pointer icon over a particular event summary, or has performed some other action within the calendar application which indicates that the user desires to view more information about a particular event or set of events. Based on this determination, the appointment manager 220 determines whether the user has selected a past event for viewing or the current view is otherwise determined to be a view of calendar history (step 416).

If the selected event is not a past event, then the appointment manager 220 invokes the future meeting module 224, which causes the calendar view to be altered in some way (step 424). In some embodiments, the future meeting module 224 may cause a new view area to be opened which will display information about the desired calendar event. In some embodiments, the future meeting module 224 will populate an existing view area with information about the desired calendar event. In either event, the future meeting module 224 obtains generic event information (step 428), which is then included in the display rendered within the designated viewing area (step 432). In some embodiments, the type of generic event information obtained by the future meeting module 224 includes one or more of: an invited participant list; a scheduled event time; a reminder time; resources required for the event; whether the event is part of a recurring series of events (some of which may have occurred in the past); an event location; and any other information which is generally useful for the planning of a future event. The generic event information which is displayed in connection with the future event may be obtained from a number of different information sources without departing from the scope of the present invention.

Referring back to step 416, if the user is viewing some portion of a calendar history, then the method continues by determining whether the user is viewing an event which has occurred (step 436). In some embodiments, an event is determined to have occurred if the scheduled time for the event is earlier than the current time. In some embodiments, a user may be required to actively indicate, by interacting with the calendar application, that an earlier scheduled event has already occurred. In some embodiments, a future event may correspond to an event which has already occurred if the future event is a part of a series of recurring events and at least one of the events in that series of recurring events has occurred in the past. In some embodiments, the future event may correspond to an event which has already occurred if the future event was scheduled as a follow-up meeting to a past event which did, in fact, occur. In some embodiments, an event which is currently in progress may be identified as a past event, since at least some portion of that event has already occurred and information can be obtained about that past occurrence.

If the event is determined not to be a past event, then the method proceeds to step 428. If, however, the event is determined to be a past event, then the method continues with the appointment manager 220 invoking the past meeting module 228 to obtain event history and relevant contextual information for displaying in connection with the event view (step 440). In some embodiments, the past meeting module 228 is capable of obtaining any type of information that may be useful in summarizing or explaining the occurrences of the past meeting. Non-limiting examples of such information include:

a summary of interactions which occurred during the event;

a list of action items identified for or during the event;

a list of participants which actually attended some or all of the event;

a list of invitees who failed to attend some or all of the event;

contextual information determined for the event based, at least in part, on exchanges which occurred during the event;

recording(s) of the event;

a transcription of the event interactions;

notes taken by a participant during the event;

document which were discussed during the event; and whether a future event has been scheduled that is at least one of a follow-up event scheduled during or based on the occurrence of the past event and a second recurring event in a series of recurring events of which the past event is a first recurring event.

These types of information are generally useful to provide a user with a high-level view of what occurred during the meeting. This may help a user to recall what actions items are required of that user as well as refresh their memory about the context of the past occurred meeting. This may be particularly useful in situations where a user is preparing for a future event which is related to the past event in some way (e.g., as a follow-up or recurring event).

Thereafter, the past meeting module 228 also obtains information related to whether or not, and to what extent, the viewing user participated in the event (step 444). This information may be obtained by querying the user, by analyzing content of the past event (e.g., an attendee list, an event transcription, an event recording, event notes, etc.), or by requesting past presence information for the user from the presence service 112.

The past meeting module 228 may then be capable of formatting the event view in accordance with the viewer's level of participation in the event (step 448). The ways in which the user's view may be altered according to their participation are myriad. Some examples include, without limitation, limiting viewable data to non-participant viewers (e.g., restricting a non-participant from viewing one or more of meeting notes, action items, determined contextual information, etc.), enhancing a non-participant's view (e.g., first displaying a contextual summary of the event, providing a transcription of the event, providing a participant list, etc.), personalizing a participant's view based on their participation (e.g., displaying the participant's event notes, displaying the action items for which the viewer is responsible, displaying information necessary for the viewer to address action items identified for the event, showing portions of the transcription where the viewer was interacting in the event, or showing portions of the event that were identified as being of interest, perhaps by the addition of a bookmark, to the viewer when they were participating in the event, etc.). Thereafter, the past meeting module 228 generates a display within the designated view area according to the user's viewing preferences and possibly based on the user's level of participation in the event (step 432).

Figure 5:
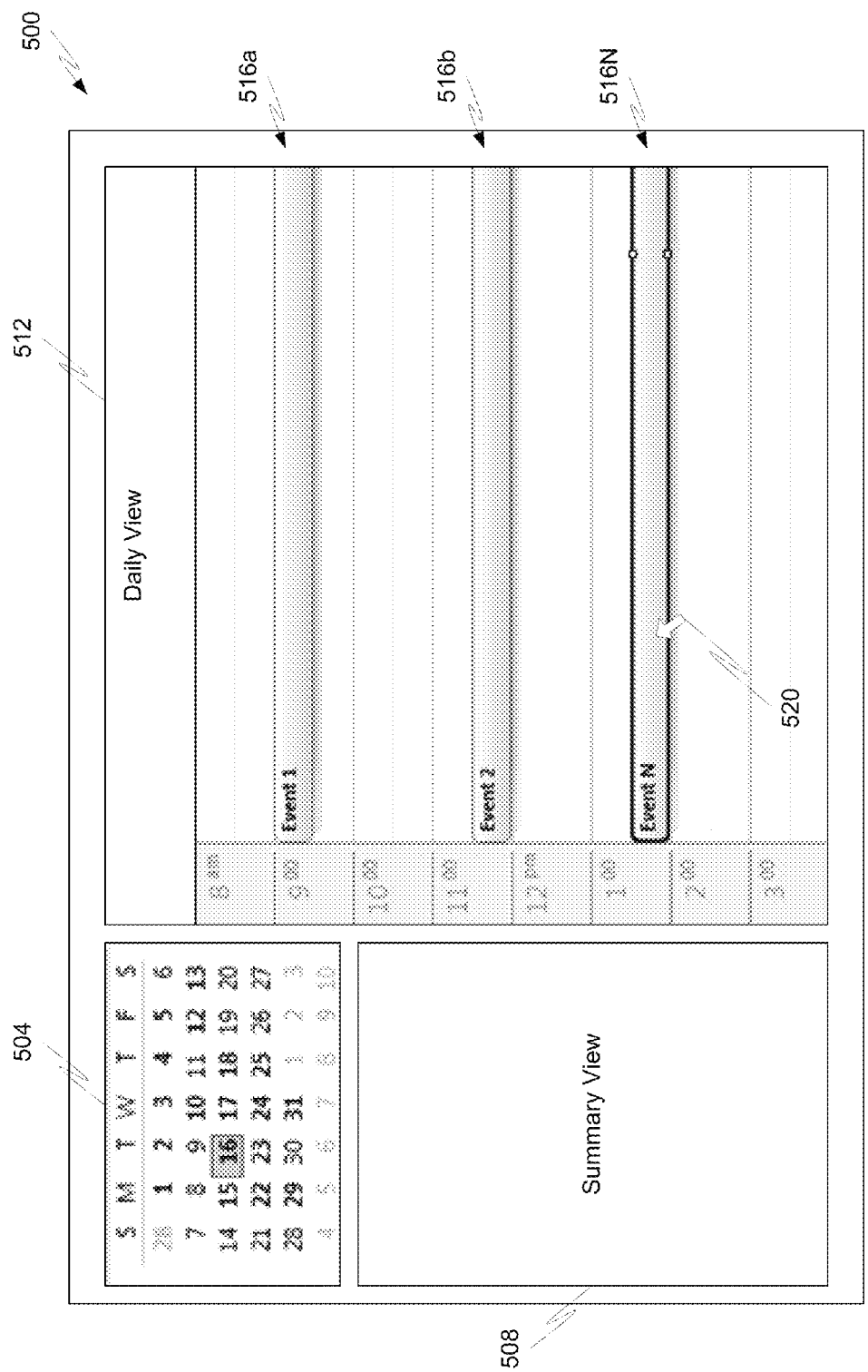
FIG. 5 depicts a first screen shot of a calendar application according to an embodiment of the present disclosure.
Figure 6:
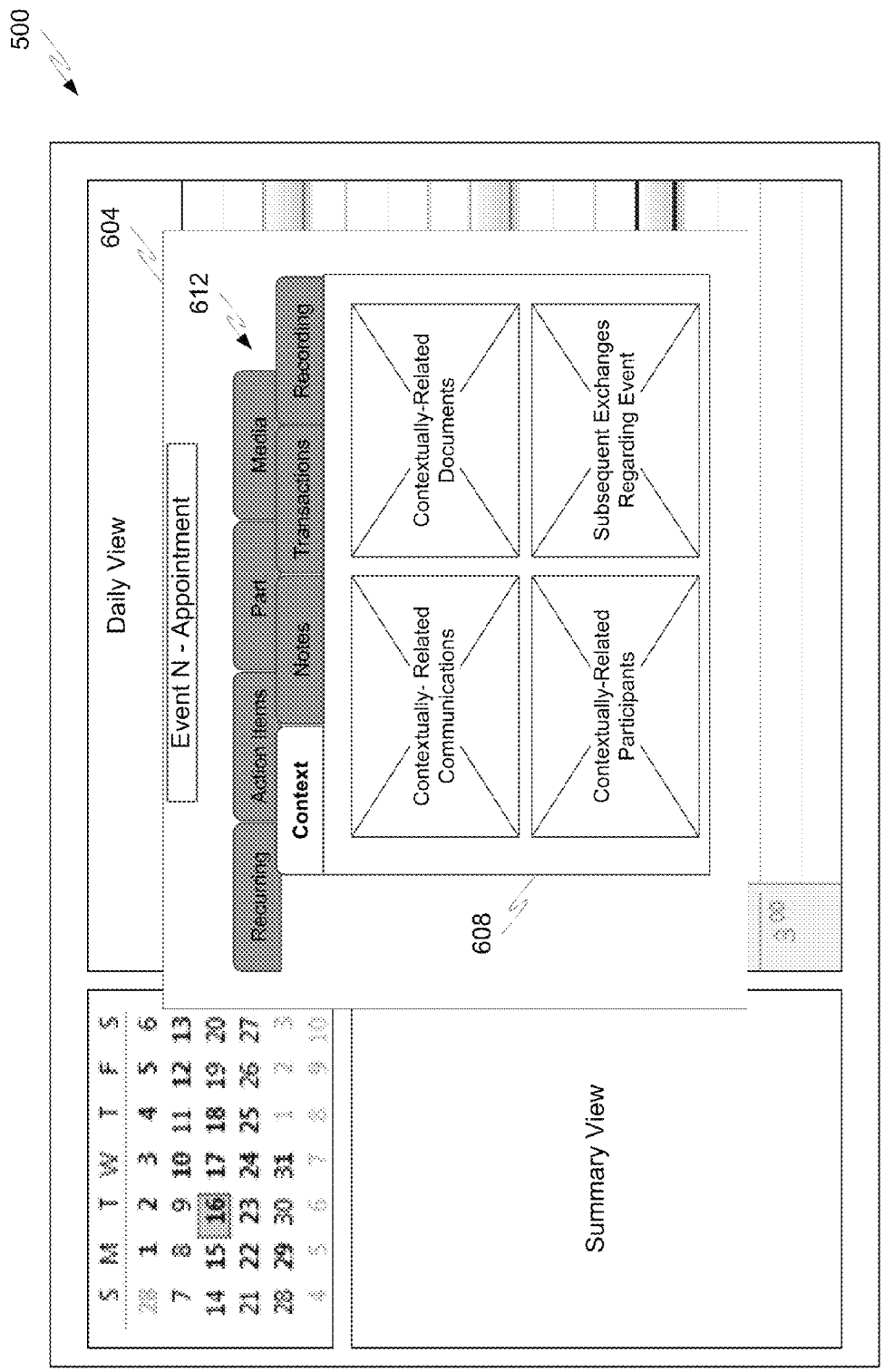
FIG. 6 depicts a second screen shot of a calendar application according to an embodiment of the present disclosure.

With reference now to FIGS. 5 and 6, exemplary user interface screen-shots will be described in accordance with at least some embodiments of the present disclosure. The information displayed is usually rendered for display via a user output 316 of the user's communication device 208. In some embodiments, the information is displayed in a purely graphical format (e.g., as a Graphical User Interface (GUI)). In some embodiments, the display may be achieved in total or in part via an audible user interface.

The user interface 500 may include a monthly viewing area 504, a summary viewing area 508, and a daily viewing area 512. The monthly viewing area 504 provides a high-level identification as to dates of past or upcoming events. In some embodiments, dates on which an event resides may be bolded within the monthly viewing area 504 and dates on which no event resides may not be bolded.

The daily viewing area 512 may include a daily calendar and a listing of events which are either upcoming or which have occurred for a selected day. The selected day may be either the current day, a day in the past, or a day in the future. Depending upon the day which is currently being viewed in the daily viewing area 512, the future 224 and/or past 228 meeting modules may be invoked to generate event views within the daily viewing area 512. In some embodiments, a number of events 516a-N may be scheduled for a single day and displayed within the daily viewing area 512. A user may be allowed to manipulate the views of the user interface with a pointer icon 520, which is controlled by the user input 312. In some embodiments, the pointer icon 520 is controlled by a mouse, touchpad, cursor ball, or the like.

If the pointer icon 520 is passed over a particular event (e.g., Event N 516N) or otherwise selected by a user, then the content within the summary viewing area 508 may be altered to display information related to the particular event. In some embodiments, the summary viewing area 508 is used as an area in which a user can gain a quick summary of a particular event without actually selected the particular event and obtaining a full event view. The summary view, in some embodiments, contains less information than a full event view would otherwise contain. In other embodiments, the summary viewing area 508 is used to present a full event view. The manner in which the summary viewing area 508 is displayed may depend upon user viewing preferences.

It should be appreciated that a pointer icon 520 does not necessarily have to pass over or select an event to show some information related to the past event. For example, a calendar event can be shown as a box or similar dedicated view area. The box could have some small tabs that indicates a type of information about the prior event. The box could have a small icon (or colored dots, etc.) that indicates a type of information associated with the prior event (e.g., notes of a conference or information from previous meetings in a recurring meeting). The box with the tabs/icons can be generated upon the user bringing up the calendaring application or dynamically as the event goes from a future to current to past event. This can be done without the user passing over or selecting the event. The tabs/icons would be generated prior to step 412 in FIG. 4.

As can be seen in FIG. 6, if a user selects a particular event for a complete event view (e.g., by clicking on the event summary or the event description within the daily viewing area 512), then a full event view area 604 is generated which may include a number of data fields or tabs 612 which organize information related to the event. Each data field or tab 612 may include its own viewing area 608 and a common area on the user interface may have its contents altered according to the particular tab 612 which is currently selected. In situations where the event currently being viewed is a past event, there are a number of useful types of information which may be displayed under a selected tab 612. For example, under a context tab, a number of contextually-related data sources may be displayed to provide a sense of context for the past event. Examples of contextually-related data sources include, without limitation, contextually-related communications, contextually-related document, contextually-related participants, and exchanges which have occurred subsequent to the occurrence of the event. This information may be provided totally within the viewing area 608 or links to the information may be displayed within the viewing area 608. The manner in which the information is displayed to a user may depend on the amount of data which is available for display and the user's viewing preferences. Other types of information which may be displayed for a past event include, without limitation:

a summary of interactions which occurred during the event;

a list of action items identified for or during the event;

a list of participants which actually attended some or all of the event;

a list of invitees who failed to attend some or all of the event;

contact information for participants or invitees or links thereto;

contextual information determined for the event based, at least in part, on exchanges which occurred during the event;

a link to a recording of the event;

a transcription of the event, a portion thereof, or a link thereto;

notes taken by a participant during the event;

a link to a document which was discussed during the event; and a link to a future event that is at least one of a follow-up event scheduled during or based on the occurrence of the past event and a second recurring event in a series of recurring events of which the past event is a first recurring event.

While the above-described flowchart has been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In one embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the embodiments, configurations, and aspects are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the disclosed embodiments, configurations, and aspects after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claims require more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   determining that a user desires to view a calendar event with a user interface of a communication device, wherein a display of the calendar event is generated in connection with a calendar application;
   determining, by the calendar application, whether the calendar event corresponds to (i) a past event; (ii) a current event; or (iii) a future event;
   obtaining an event history for the calendar event;
   obtaining a level of participation of the user in the calendar event;
   configuring a display of the calendar event on the user interface in accordance with the determination of whether the calendar event corresponds to (i) a past event; (ii) a current event; or (iii) a future event;
   displaying the calendar event such that the display of the calendar event includes relevant information from at least one of a past event and a future event, the relevant information including a link to a future event that is at least one of a follow-up event scheduled during or based on the occurrence of the past event and a second recurring event in a series of recurring events of which the past event is a first recurring event, wherein the calendar event and the at least one of the past event and the future event are part of the same recurring event; and
   configuring the display of the calendar event history based on the level of participation of the user in the calendar event, wherein the level of participation of the user in the calendar event is based on the user having participated in the calendar event, wherein the display of the past event further includes a display of a transcription of the event, and wherein the display of the transcription of the event is personalized based on the user's participation such that one or more portions of the transcription where the user was interacting in the event are displayed to the user.

2. The method of claim 1, wherein the calendar event is determined to correspond to a past event.

3. The method of claim 2, wherein the display of the past event includes a display of at least one of the following types of information:
   a list of invitees who failed to attend some or all of the event;

contextual information determined for the event based, at least in part, on exchanges which occurred during the event.

4. The method of claim 1, wherein the level of participation of the user in the calendar event further depends upon whether the user attended some or all of the calendar event and whether the user added content to the calendar event.

5. The method of claim 1, wherein the calendar application is executed, at least in part, by the communication device.

6. The method of claim 1, wherein the calendar application is executed by a server that is accessible by the communication device.

7. The method of claim 1, wherein the display of the past event is further personalized based on the user's participation such that one or more portions of the transcription identified as being of interest are displayed to the user.

8. A tangible and non-transitory computer readable medium containing computer instructions stored therein for causing a computer processor to perform the method of claim 1.

9. A communication system, comprising:
a microprocessor configured to execute programming instructions stored in memory; and
memory comprising a set of instructions including a processor readable and executable appointment manager comprising a future meeting module and a past meeting module, the appointment manager configured to:
determine that a user desires to view a calendar event with a user interface of a communication device;
determine whether the calendar event corresponds to (i) a past event; (ii) a current event; or (iii) a future event;
invoke one of the future meeting module and the past meeting module based on whether the calendar event corresponds to one of (i) a past event; (ii) a current event; and (iii) a future event; and
display the calendar event such that the display of the calendar event includes relevant information from at least one of a past event and a future event, the relevant information including a link to a future event that is at least one of a follow-up event scheduled during or based on the occurrence of the past event and a second recurring event in a series of recurring events of which the past event is a first recurring event, and wherein the calendar event and the at least one of the past event and the future event are part of the same recurring event;
wherein the past meeting module is configured to:
obtain an event history for the calendar event;
obtain a level of participation of the user in the calendar event; and
configure the display of the calendar event history based on the level of participation of the user in the calendar event, wherein the level of participation of the user in the calendar event is based upon the user having participated in the calendar event, and wherein the display of the past event further includes a display of a transcription of the event personalized based on the user's participation such that one or more portions of the transcription where the user was interacting in the event are displayed to the user.

10. The system of claim 9, wherein the set of instructions are provided as a plugin to at least one of a calendar application and a conference application.

11. The system of claim 9, wherein the set of instructions are executed by a server and accessible by a plurality of communication devices.

12. The system of claim 9, wherein the calendar event is determined to correspond to a past event and wherein the past meeting module is invoked by the appointment manager.

13. The system of claim 12, wherein the display of the past event includes a display of at least one of the following types of information:
a summary of interactions which occurred during the event;
a list of action items identified for or during the event;
a list of participants which actually attended some or all of the event;
a list of invitees who failed to attend some or all of the event;
contextual information determined for the event based, at least in part, on exchanges which occurred during the event;
a link to a recording of the event;
notes taken by a participant during the event;
a link to a document which was discussed during the event.

14. The system of claim 9, wherein the past meeting module is invoked when the calendar event corresponds to either a current event or a past event, wherein the calendar event is determined to correspond to a current event and wherein transactions which are currently occurring or which have recently occurred are displayed as a part of the event view.

15. A communication device comprising a processor and memory, the communication device further including a user interface configured to display information processed by the communication device for a user of the communication device, the user interface displaying:
a representation of information generated by a calendar application and presented within a presentation area, the presentation area including an event view that is alterable depending upon whether the event currently being viewed within the event view is a past event or not a past event, the representation of information including at least one of relevant information from a past event and relevant information from an event that is not a past event, the relevant information comprising a link to an event that is not a past event that is at least one of a follow-up event scheduled during or based on the occurrence of the past event and a second recurring event in a series of recurring events of which the past event is a first recurring event, wherein the event being viewed and the at least one of the past event and the event that is not a past event, are part of the same recurring event, the presentation area further including a display of calendar event history based on a level of participation of a user in the calendar event, wherein the level of participation of the user in the calendar event is based on the user having participated in the calendar event, the display of the past event further including a display of a transcription of the event personalized based on the user's participation such that one or more portions of the transcription where the user was interacting in the event are displayed to the user.

16. The device of claim 15, wherein the presentation area further displays at least one of the following types of information:
a summary of interactions which occurred during the event;
a list of action items identified for or during the event;
a list of participants which actually attended some or all of the event;
a list of invitees who failed to attend some or all of the event;

contextual information determined for the event based, at least in part, on exchanges which occurred during the event;
a link to a recording of the event;
notes taken by a participant during the event;
a link to a document which was discussed during the event.

17. The device of claim 15, wherein a first type of information is included in the event view when the event is a past event and wherein the first type of information is not included in the event view when the event is not a past event.

* * * * *